United States Patent [19]
Kline

[11] Patent Number: 5,203,496
[45] Date of Patent: Apr. 20, 1993

[54] THERMOSTATIC CONTROL VALVE WITH FLUID MIXING

[75] Inventor: Kevin B. Kline, Indianapolis, Ind.

[73] Assignee: Lawler Manufacturing Co., Inc., Indianapolis, Ind.

[21] Appl. No.: 664,356

[22] Filed: Mar. 4, 1991

[51] Int. Cl.⁵ .......................................... G05D 23/13
[52] U.S. Cl. .................................... 236/12.2; 137/996; 138/42; 138/44; 366/336; 366/340
[58] Field of Search .................. 366/336, 340; 138/42, 138/44; 137/896, 897; 236/12, 18, 12.2

[56] References Cited

U.S. PATENT DOCUMENTS

| | | | |
|---|---|---|---|
| 1,915,867 | 6/1933 | Penick | 138/42 |
| 2,125,245 | 7/1938 | McCray | 138/42 |
| 2,203,130 | 6/1940 | Costello | 366/340 |
| 2,855,151 | 10/1958 | Lesovsky | 137/896 X |
| 3,361,412 | 1/1968 | Cole, III | 138/42 X |
| 3,593,964 | 7/1971 | Morane | 138/42 X |
| 4,514,095 | 4/1985 | Ehrfeld et al. | 366/340 |

Primary Examiner—William E. Tapolcai
Attorney, Agent, or Firm—Woodard, Emhardt, Naughton, Moriarty & McNett

[57] ABSTRACT

A thermostatic control valve assembly for use in continuously mixing a hot first fluid with a cold second fluid to continuously produce a mixed fluid at a constant temperature. The valve assembly includes an improved mixing dome defining a mixing chamber that facilitates thorough mixing of the hot and cold fluids over a wide range of flow rates, including rates as low as two gallons per minute. The improved mixing performance is accomplished by a plurality of baffles sequentially disposed along the flow path within the mixing chamber. Each baffle defines an elongated opening which is angularly displaced from the elongated opening of the other baffles to turn the fluid flow, thereby optimally mixing the hot and cold fluids over a wide range of flow rates.

10 Claims, 2 Drawing Sheets

THERMOSTATIC CONTROL VALVE WITH FLUID MIXING

BACKGROUND OF THE INVENTION

The present invention relates to the field of fluid mixing valve assemblies. More particularly, the invention concerns thermostatically controlled mixing valve assemblies in which a thermostat is immersed in the fluid flowing through the valve.

Thermostatic control valve assemblies are well known in the art and have long been utilized in various applications including group showers, washing stations, hospital hydrotherapy installations and in many industrial applications where precision thermostatic water blending is essential. In order to operate properly, the hot and cold water entering such a valve assembly must be thoroughly blended before the temperature of the mixture is sensed by the thermostat. If the hot and cold water are not adequately mixed, the valve assembly can behave erratically because the temperature sensor sees pockets of hot and cold water instead of a mixture that is at a single temperature throughout. One problem that has long persisted in the art is the inability of most valve assemblies to adequately mix the hot and cold water over a wide range of flow rates. Consequently, multiple valves often have to be used to satisfy flow requirements.

Another problem that has persisted in the art is the physical size of the valve assembly required for a specific application. Often, the valve assembly is simply too large because of the need for a large mixing chamber to adequately mix the hot and cold water. What is needed is a thermostatic control valve assembly having an improved mixing chamber that has the ability to thoroughly mix the hot and cold water over a wide range of flow rates, and which does so in a smaller physical space than valve assemblies currently known in the art.

SUMMARY OF THE INVENTION

A thermostatic control valve assembly for continuously mixing a hot first fluid with a cold second fluid to continuously produce a mixed fluid at a constant temperature according to one embodiment of the present invention comprises a cold fluid inlet, a hot fluid inlet, a mixing dome defining a mixing chamber, thermostatically controlled flow control valve and operably connected thermostat for adjusting the flow of the hot and cold fluids into the mixing chamber. The mixing dome includes a plurality of baffles sequentially placed in the flow path to promote better mixing of the hot and cold fluids before the mixed fluid contacts the thermostat disposed in the fluid flow path. Each baffle defines an elongated opening therethrough and the mixing performance is further improved by angularly displacing the elongated opening of each baffle with respect to the elongated openings of the remaining baffles. The mixing dome includes means for supporting the thermostat between the baffles and the fluid outlet of the dome.

A general object of the present invention is to provide an improved thermostatic control valve assembly. Another more specific object is to provide a valve assembly that more efficiently mixes hot and cold fluids for sensing the temperature of the mixture.

Related objects and advantages of the present invention will be apparent from the following description.

DESCRIPTION OF THE PREFERRED EMBODIMENT

Figure 1:
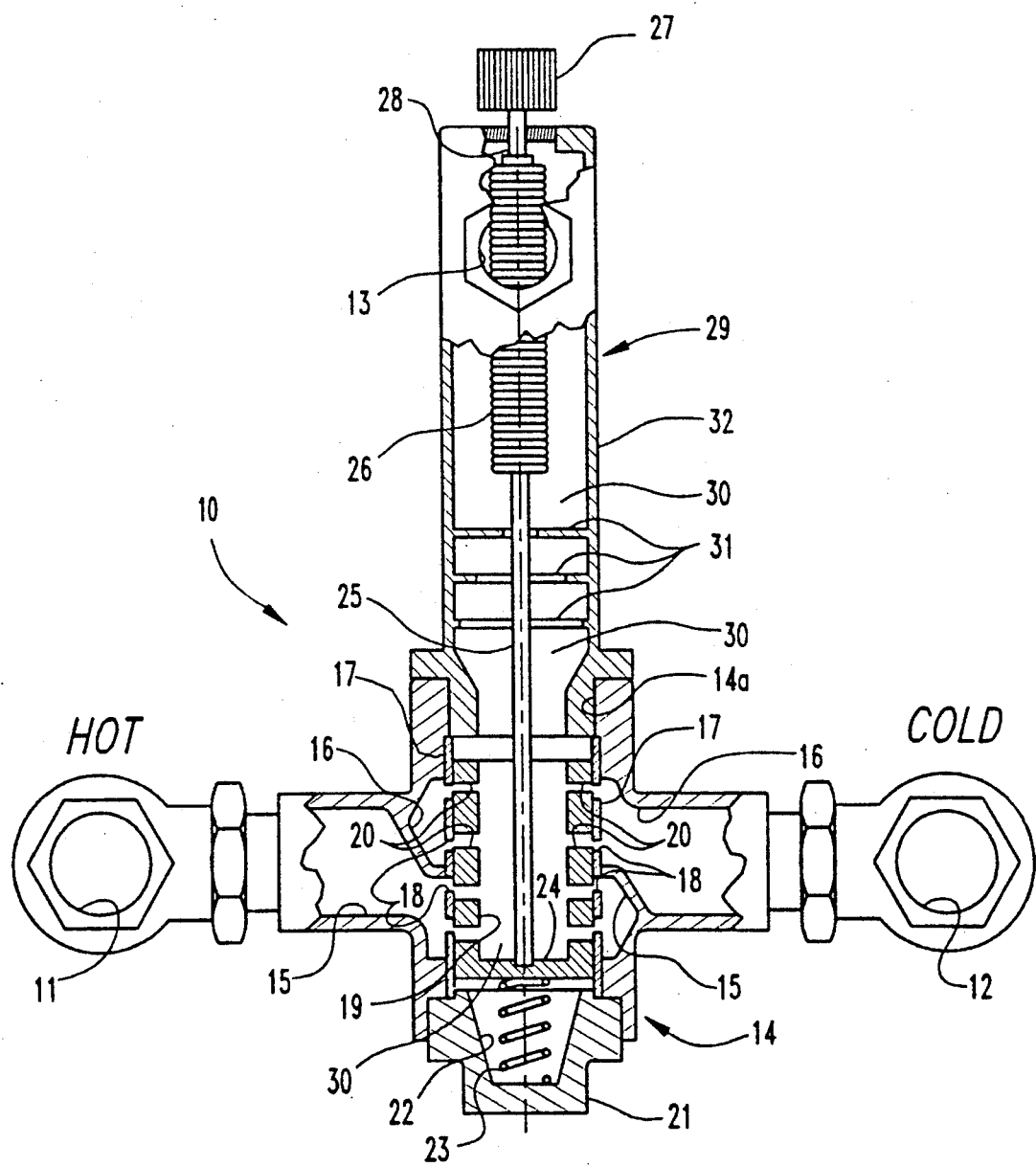
FIG. 1 shows a side cross-sectional view of a thermostatic control valve assembly according to the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a thermostatic control valve assembly 10 with fluid mixing according to the preferred embodiment of the present invention. Valve assembly 10 includes a hot inlet 11, a cold inlet 12 and an outlet 13. Inlets 11 and 12 are connected to opposite sides of flow control valve 14 and open to annular cavities 15 and 16, respectively, within the flow control valve. The inner wall of annular cavities 15 and 16 is defined by a cylindrically shaped liner 17. Liner 17 is open at both ends and includes a plurality of openings or slots 18 which are distributed around its circumference in communication with cavities 15 and 16.

Slidably mounted within liner 17 is a cylindrically shaped piston 19 which is open at its upper end. Piston 19 is preferably pressure balanced and includes a plurality of openings or slots 20 that are distributed around its circumference. Preferably, each opening 20 through piston 19 has a counterpart opening 18 in liner 17. Modulation of the piston 19 within the liner 17 variably opens the cavities 15 and 16 to the interior of the piston 19, which communicates the combined hot and cold fluid to the outlet 14a of the flow control valve.

Flow control valve 14 also includes a bottom plug 21 which can be removed to allow access to repair, replace or clean the interior parts of flow control valve 14. Bottom plug 21 defines a cavity 22 therein which substantially receives compressed valve spring 23. Valve spring 23 is supported at one end by bottom plug 21 and is connected at its other end to the base 24 of piston 19. The spring 23 applies a return force to piston 19.

Also connected to base 24 is push rod 25. The opposite end of push rod 25 is connected to a thermostat 26. Thermostat 26 can be of many types known in the art, such as a thermal coil or a temperature sensitive bellows. Such a thermostat is designed to expand or contract along the axis defined by push rod 25 in linear proportion to a change in the temperature of fluid surrounding the thermostat. In this embodiment, thermostat 26 is connected to adjustment screw 27 via shaft 28. Adjustment screw 27 acts against spring 23 and thus allows the vertical position of the thermostat 26 and ultimately of the piston 19 to be adjusted, which in turn alters the relative proportions of hot and cold fluid passing through openings 20.

A mixing dome 29 is engaged over the outlet 14a of the flow control valve 14. The mixing dome 29 defines a mixing chamber 30 therein which is preferably cylindrical in configuration. An important feature of the present invention is the inclusion in the mixing dome 29 of means for turning the fluid flow through the mixing chamber 30 to ensure complete mixing of the hot and cold fluid exiting the flow control valve 14. Complete fluid mixing assures a uniform temperature throughout the fluid discharged through outlet 13. According to the invention, the means for turning the fluid includes a plurality of baffles 31 that are integrally formed as part of housing 32.

The shape and relative arrangement of baffles 31 are intended to induce more thorough blending of the hot and cold fluids in mixing chamber 30 before the mixture contacts thermostat 26, particularly at low flow rates. One problem that has persisted in the art is the inability of valve assemblies to operate properly over a wide range of flow rates. In other words, a flow control valve assembly is only useful over the range of flow rates that the device is able to thoroughly blend the hot and cold fluids before the mixture contacts the thermostat. While many known mixing valve assemblies are capable of adequate fluid mixing at high flows, a need remains for a valve assembly that is also capable of thorough hot and cold fluid mixing at low flow rates, such as below 10 g.p.m.

In order to reliably react to a change in the temperature of the fluid mixture, the thermostat must be immersed in the mixture, and the mixture must have a substantially uniform temperature throughout rather than consisting merely of hot and cold pockets. The problem of inadequate mixing occurs primarily at low flow rates. Baffles 31 of the present invention tend to induce turbulence into the flow that results in a substantially uniform fluid mixture and temperature prior to flowing around the fluid-immersed thermostat.

Figure 2:
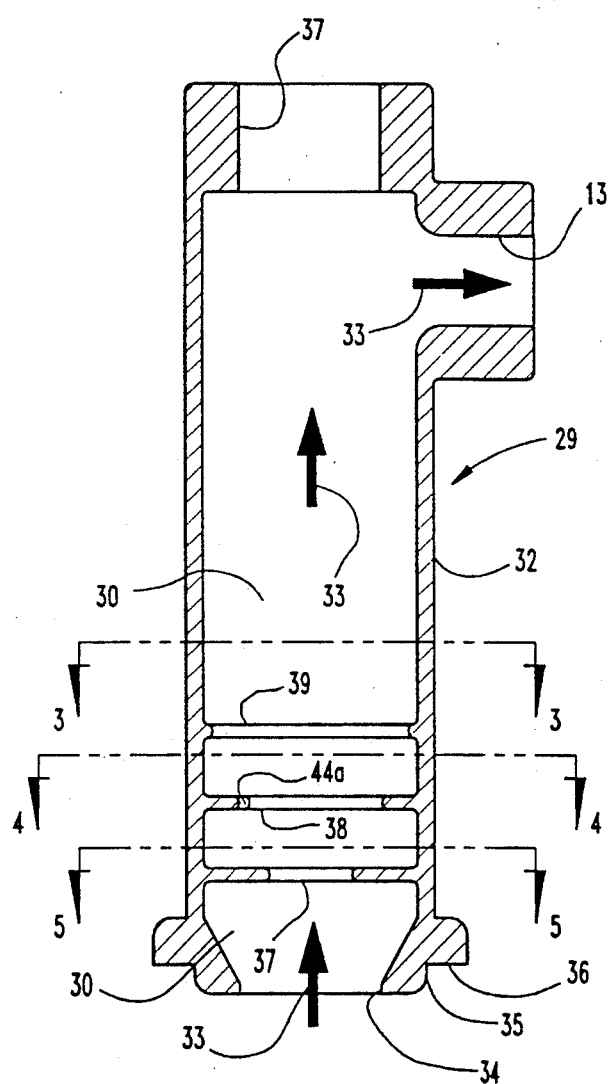
FIG. 2 shows a side cross-sectional view of a housing defining an improved mixing chamber for the valve assembly shown in FIG. 1.

The mixing dome 29 is shown in more detail in FIG. 2. The housing 32 defines the mixing chamber 30 therein and a flow path 33 therethrough. The housing 32 is provided with a mating surface 35 and an annular flange 36 that enable the housing to be mated to flow control valve 14 by conventional means. Housing 32 also defines an opening 37 at its top which permits an adjustment means, such as screw 27 and shaft 28, to be connected to the thermostat, as better shown in FIG. 1. In operation, the fluid leaving flow control valve 14 enters housing 32 through inlet 34. Immediately afterwards, the fluid encounters baffles 37, 38 and 39 in successive order. The fluid mixture then continues upward along flow path 33 until finally exiting housing 32 through outlet 13.

The outlet 13 is positioned at the end of the mixing chamber or fluid flow path to ensure that the thermostat 26 is substantially immersed in the fluid exiting the valve assembly 10. Moreover, the thermostat 26 is disposed downstream of the sequential baffles, preferably by a distance greater than the distance between successive baffles. Thus, the hot and cold fluids are substantially mixed prior to the thermostat, and substantially all of the thermostat is exposed to the fluid mixture to assure that the thermostat receives a proper indication of the temperature of the exiting fluid.

Figure 3:
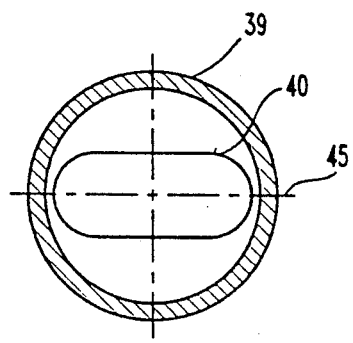
FIG. 3 is a top view along section A—A of FIG. 2 showing a first baffle according to the present invention.
Figure 4:
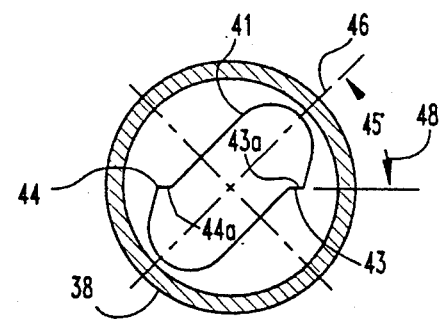
FIG. 4 is a top view along section B—B of FIG. 2 showing a second baffle according to the present invention.
Figure 5:
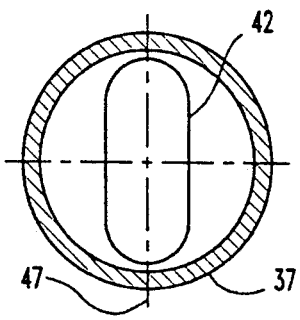
FIG. 5 is a top view along section C—C of FIG. 2 showing a third baffle according to the present invention.

A more detailed view of each baffle is provided in the sectioned views of FIGS. 3, 4 and 5. Each baffle is disc shaped and defines an elongated or oblong opening 40, 41 and 42 respectively therethrough. Oblong openings 40, 41 and 42 are substantially similar in shape and size, except for the two notches 43 and 44 integral with opening 41 in baffle 38. The two notches 43 and 44 are situated on opposite ends and sides of the opening 41, as shown in FIG. 4, and each includes a respective face 43a and 44a that is aligned with the major axis of symmetry (45 in FIG. 3) of the third baffle 39. Notches 43 and 44 facilitate manufacture of the housing 32 and baffles by conventional casting techniques, such as sand casting.

Each respective oblong opening 40, 41 and 42 also defines a corresponding major axis of symmetry 45, 46 and 47 which is useful in illustrating the helical arrangement of baffles 37, 38 and 39 in flow path 33. In this embodiment, each successive major axis of symmetry is rotated through an angle 48, which in this case is 45 degrees, to produce a generally helical flow path through the baffles. Each baffle alone tends to create some turbulence in a fluid passing therethrough due to the fluid restriction through the baffle opening. However, the helical pattern of successive baffles creates an overall amount of mixing which is greater than the sum of the individual baffles acting alone.

The size of the openings must be sufficiently large as to not significantly impede fluid flow through the openings, but sufficiently small to induce adequate mixing of the hot and cold fluid passing through the mixing chamber.

In one specific embodiment of the invention, the housing 32 is of sand-cast bronze and defines a cylindrical mixing chamber 2.0 inches in diameter and about 10.0 inches in length from the base of the mixing chamber to the center of the outlet opening 13. Each of the openings 40-42 in the baffles 37-39, respectively, are oblong with a length of 1.8 inches and a width of 1.0 inches. The baffles are spaced about 1 inch apart. The valve assembly 10 of the specific embodiment is capable of accurately controlling the outlet fluid temperature at flows of 2-80 g.p.m. The fluid mixing provided by the baffles is particularly important at the low flow rates since the fluid flow can "short-circuit" the thermostat in which the entire thermostat is not immersed in the fluid flow prior to the outlet 13.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For instance, in the preferred embodiment, the baffles 37, 38 and 39 are integrally formed in the housing 32 by known casting techniques. The invention further contemplates that each baffle is itself a separate disc that is suitably mounted within a cylindrical cavity in the housing. For instance, the separate baffle discs could be held in position using snaprings engaged within snapring grooves formed in the housing.

Moreover, the invention contemplates incorporating additional baffles sequentially disposed along the flow path. The elongated openings in the baffles, including the additional baffles, preferably have their respective axes of symmetry arranged in the helical pattern described above. Thus, while the oblong openings 40-42 of the preferred embodiment are rotated 45° relative to each other, the addition of more baffles permit smaller relative angular displacements between consecutive baffles.

What is claimed is:

1. A thermostatic control valve assembly for mixing a hot fluid and a cold fluid for discharge at a controlled temperature, the valve assembly comprising:

a cold fluid inlet;

a hot fluid inlet;

flow control valve means for controllably mixing hot and cold fluid received through said hot fluid inlet and said cold fluid inlet, respectively;

a housing defining a fluid outlet and a mixing chamber providing a fluid flow path between said flow control valve means and said outlet;

means for turning the fluid flow through the mixing chamber including a plurality of baffles sequentially arranged in said flow path and integrally formed in said housing;

each of said plurality of baffles being a disc having an elongated opening therethrough and including a first baffle, a second baffle and a third baffle;

said elongated opening of each of said first, second, and thrid baffles defining a major axis of symmetry; and said major axis of said first baffle and said major axis of said third baffle being angularly displaced from said major axis of said second baffle; and a thermostat disposed within said mixing chamber between said means for turning the fluid flow and said fluid outlet and operably connected to said flow control valve means to control said flow control valve means in response to the temperature of fluid flowing through said mixing chamber.

2. The thermostatic control valve assembly of claim 1, wherein:

said major axis of said first baffle and said major axis of said third baffle are angularly displaced by angle of 45 degrees from said major axis of said second baffle.

3. The thermostatic control valve assembly of claim 1, wherein:

said major axis of said first baffle is angularly displaced from said major axis of said third baffle.

4. The thermostatic control valve assembly of claim 3, wherein:

said major axis of said first baffle is angularly displaced by 90 degrees from said major axis of said third baffle.

5. A mixing dome for use in a thermostatic control valve assembly having a hot fluid inlet, a cold fluid inlet, a thermostatically controlled flow control valve combining hot and cold fluid received through the respective inlets, a thermostat operably coupled to the flow control valve for adjusting the amount of hot and cold fluid combined in response to the temperature of the fluid mixture, said mixing dome comprising:

a housing defining an inlet, an outlet and a mixing chamber providing a fluid flow path between said inlet and said outlet;

means for turning the fluid flow through the mixing chamber including a plurality of baffles sequentially arranged in said flow path and integrally formed in said housing;

each of said plurality of baffles being a disc having an elongated opening therethrough and including a first baffle, a second baffle, and a third baffle;

said elongated opening of each of said first, second, and third baffles defining a major axis of symmetry; and said major axis of said first baffle and said major axis of said third baffle being angularly displaced from said major axis of said second baffle;

means for engaging said housing to the flow control valve with said inlet of said housing in fluid communication with the outlet of the flow control valve; and means for supporting the thermostat within said mixing chamber between said means for turning the fluid flow and said outlet of said housing.

6. The thermostatic control valve assembly of claim 5, wherein:

said major axis of said first baffle and said major axis of said third baffle are angularly displaced by angle of 45 degrees from said major axis of said second baffle.

7. The thermostatic control valve assembly of claim 5, wherein:

said major axis of said first baffle is angularly displaced from said major axis of said third baffle.

8. The thermostatic control valve assembly of claim 7, wherein:

said major axis of said first baffle is angularly displaced by 90 degrees from said major axis of said third baffle.

9. A mixing dome for a thermostatic control valve assembly comprising:

an elongated cylindrically shaped housing open at one end and defining a cavity therein for receiving a thermostat and also defining an outlet opening to said cavity remotely located from said one end, said housing having a plurality of baffles integrally formed therein and sequentially positioned within said cavity near said one end, said one end having means for mating said housing to a flow control valve, each of said plurality of baffles defining an oblong opening therethrough and including a first baffle, a second baffle, and a third baffle;

said oblong opening of each of said first, second, and third baffles defining a major axis of symmetry; and said major axis of each sequential baffle being sequentially rotated by 45 degrees.

10. The mixing dome of claim 9, wherein said second baffle further defines a pair of opposite notches integral with said oblong opening, each of said pair of opposite notches having a face aligned with said major axis of said third baffle.

* * * * *